United States Patent [19]

Walraven et al.

[11] 3,918,091

[45] Nov. 4, 1975

[54] DEVICE FOR CONTROLLING THE POSITION OF A MAGNETIC HEAD WITH RESPECT TO AN INFORMATION TRACK TO BE FOLLOWED

[75] Inventors: Anthonie Walraven; Jacob Koorneef; Jan Antoon Ludolf Potgiesse, all of Eindhoven, Netherlands

[73] Assignee: U.S. Philips Corporation, New York, N.Y.

[22] Filed: July 9, 1974

[21] Appl. No.: 486,772

[30] Foreign Application Priority Data

July 10, 1973 Netherlands ........................ 739590

[52] U.S. Cl. .................... 360/77; 360/109; 360/113

[51] Int. Cl.²G11B 21/10; G11B 21/20; G11B 5/48; G11B 5/56

[58] Field of Search ....... 360/77, 113, 75, 104, 109, 360/123, 125; 338/32 R; 340/174 MS

[56] References Cited

UNITED STATES PATENTS

| | | | |
|---|---|---|---|
| 3,256,483 | 6/1966 | Broadbent | 360/113 |
| 3,789,378 | 1/1974 | Bonzano | 360/77 |
| 3,848,217 | 11/1974 | Lazzari | 360/113 |

*Primary Examiner*—Alfred H. Eddleman
*Attorney, Agent, or Firm*—Frank R. Trifari; Simon L. Cohen

[57] ABSTRACT

A device for the automatic control of the position of the playback head with respect to an information track recorded on a magnetic recording medium co-operating with the playback head. For generating a signal for controlling the position of the head, the device comprises an elongate element of magnetoresistance material having two final taps and one center tap. The difference of the voltages across each final tap and the center tap is indicative of the position of the head.

4 Claims, 3 Drawing Figures

Figures 1, 1A:
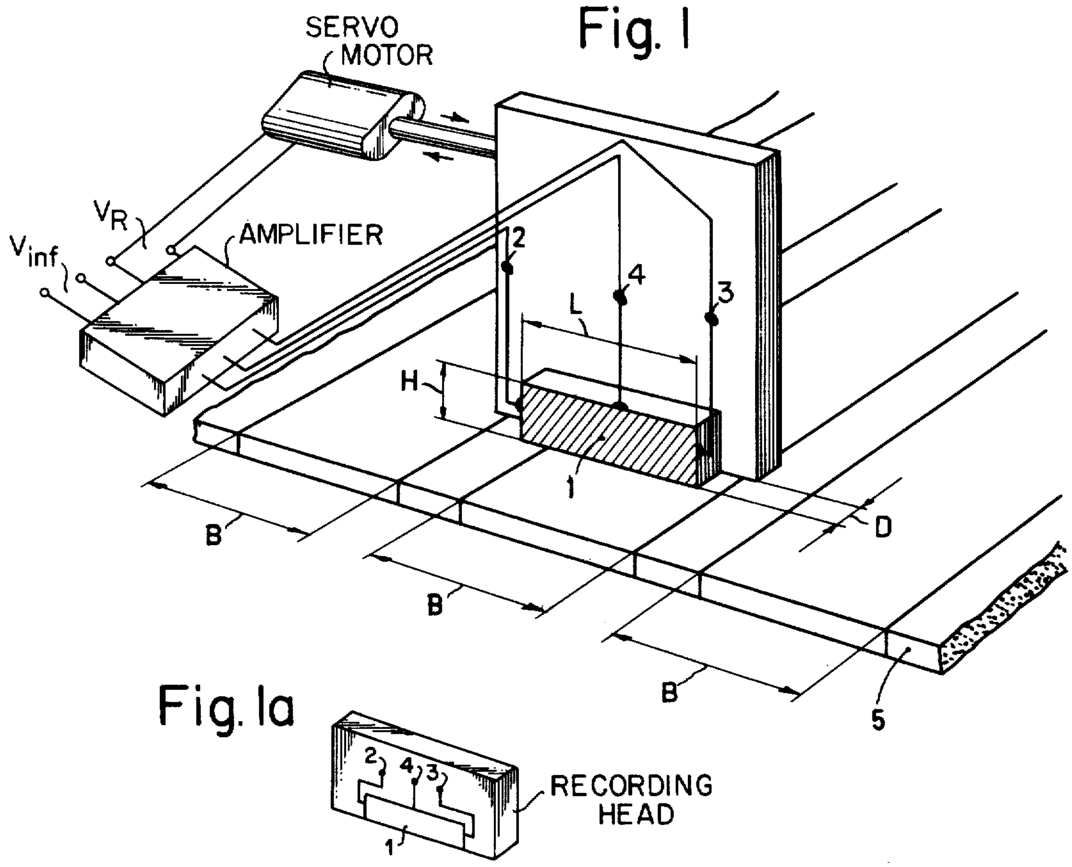

DEVICE FOR CONTROLLING THE POSITION OF A MAGNETIC HEAD WITH RESPECT TO AN INFORMATION TRACK TO BE FOLLOWED

The invention relates to a device for the automatic control of the position of a magnetic playback head with respect to a selected information track of a number of information tracks recorded on a magnetic recording medium, which device comprises a sensing device for generating an error signal which is a function of the deviation of the head from the center of the track, and comprises positioning means which are controlled by the error signal for moving the head to arrange it centrally on the track.

When the information recorded on a recording medium, for example a magnetic tape or a magnetic disc, is played back by means of a magnetic head, it is of essential importance that the head constantly follows the information track on the recording medium exactly and this independently of possible shifts of the record medium which, in the case in which this is a magnetic tape, may occur due to vibrations during the travel of the tape, or, in the case in which the medium is a magnetic disc, by a possible eccentricity of the track as a result of the fact that the information has not been recorded on the recording medium in the device used for playing back.

The number of tracks of information which is recorded on magnetic recording media has ever been increasing in the past several years. As a result of this the width of one single track and the distance between the tracks has inevitably become smaller. In a certain available type of video recording device, the tracks, for example, have a width of 150 $\mu m$ with a track distance of 25 $\mu m$. This means that stringent requirements are imposed upon the accuracy with which a magnetic head follows a given information track.

It is the object of the invention to provide a device with which it is possible to cause a playback head to accurately follow information tracks with the above-mentioned or even considerably smaller width.

For that purpose, the device according to the invention is characterized in that the sensing device comprises an elongated sensing element of magnetoresistance material which has a first and a second end tap and a center tap and the length of which corresponds to the track width used. The difference between the voltage across the first end tap and the center tap and the voltage across the second end tap and the center tap is indicative of the position of the playback head with respect to the recorded information track.

For generating a signal with which a head can be controlled it is known per se to use a conventional head having two poleshoes one of which is divided into two parts so that the information track is divided into two parts which are played back separately. By adding the two playback signals, a single output signal is obtained in principle which is proportional to the full track width, while subtraction provides a difference signal which is a measure of the transverse deviation between head and track.

However, the division of a poleshoe presents serious structural problems with smaller track widths where track widths are below 100 $\mu m$, and when ferrite is used as a magnetic material. In addition, efficiency differences between the two head halves should be taken into account, as a result of which, when used in a servo loop, an "offset" with respect to the desired head position will occur which differs for each individual head. Moreover, the coupling between the two halves is considerable.

The device according to the invention in which a magneto-resistance element with two end taps and a center tap is used does not exhibit these drawbacks.

That certain magnetic materials having a low coercive force, for example permalloy, present a magneto-resistance effect is known from the U.S. Pat. No. 3,493,694. When a thin strip of such a material is placed in a magnetic field, its resistance varies in accordance with the strength of the field. Information stored in a recording medium can be read-out by conveying a direct current or an alternating current through a magneto-resistance strip arranged in the proximity of the recording medium and measuring the voltage differences across the strip caused by its resistance variations.

Although the sensing device with a magnetoresistance element according to the invention may be used to control the position of a separate playback head which is aligned accurately with respect to the magnetoresistance element, it is an additional aspect of the invention that the magnetoresistance element itself may also be used as a playback head, so that a separate playback head is superfluous. A preferred embodiment of the device according to the invention is for that purpose characterized in that the sensing element is also a playback head in which the sum of the voltage across the first end tap and the center tap, and the voltage across the second end tap and the center tap represents the information recorded in the information track.

A further preferred embodiment of the device according to the invention is characterized in that the halves of the sensing element of magnetoresistance material which are present on either side of the center tap are decoupled magnetostatically.

Depending upon the magnetoresistance material used, this may show a coherent or an incoherent rotation of the magnetization vector under the influence of a magnetic field. A material having an incoherent rotation does not present particular problems when used in a device according to the invention, since the two halves of the elements are "automatically" decoupled. When a material is used having a coherent rotation it is recommendable, however, to ensure that the two halves are decoupled so that no exchange coupling can occur. This can be realized, for example, by making the magnetoresistance material inoperative in the center by alloying it with another material or by providing a scratch in it.

Since information can be played back but cannot be recorded with a magnetoresistance element, a magnetoresistance playback head will in most applications have to be combined with a recording head. It may be of importance, for example, in systems in which the recorded information is played back again immediately, that the gap of the recording head and the magnetoresistance element be located as closely together as possible. In a further preferred embodiment of the device according to the invention this is realized in that the sensing element of magnetoresistance material extends in the gap of a recording head.

The various characteristic features and advantages of the present invention will be described in greater detail with reference to the drawing.

Figure 2:
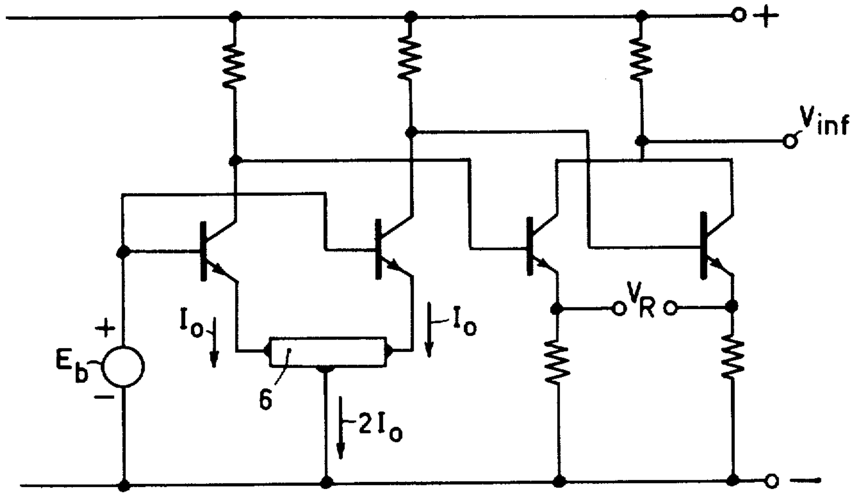

FIG. 1 is an elevation of a magnetoresistance sensing element to be used in a device according to the invention, FIG. 1*a* is a view in elevation of the sensing element of FIG. 1 in the air gap of a magnetic recording head, and FIG. 2 shows a diagram of an amplifier with which a signal generated by the element shown in FIG. 1 can be amplified.

According to the invention, in sensing narrow tracks a magnetoresistance element 1 is used having two electric connections 2 and 3 at the ends and a center tap 4 (FIG. 1) the overall length L of which corresponds to the track width B used. For an element having a resistivity $\rho$ and a thickness D = 1,000 A, height H = 2 $\mu$m and length L = 50 $\mu$m, the resistance in a particular case is given by $$R = \frac{L.\rho}{D.H} = 140\Omega.$$

For a permalloy element the resistance variation $\Delta$ R/R under the influence of the field from the recording medium 5 is in the order of 1 to 1.5 percent. Reading the resistance variation with a current of 1 mA then already provides a signal voltage of 1.4 to 2.1 mV which can be amplified in a comparatively simple manner, the noise level being low. Amplification may take place, for example, by means of the transistor circuit shown in FIG. 2 in which an advantage is that the resistance of the detection element is such that it can be connected directly to the transistor circuit. When the substrate is of a suitable crystalline material, for example silicon, the transistor circuit may be formed on the same substrate as the detection element in order to form an integrated circuit. An advantage is that the sensitivity to interference pulses is considerably reduced by the small distance between the amplifier and the detection element. The current $I_o$ through the magnetoresistance element 6 is adjusted by means of the voltage $E_b$. The collector voltage difference $V_R = V_{c1} - V_{c2}$ then is available as a control voltage for a conventional servo motor device (not shown) with which the position of the head is controlled, while the information signal $V_{Inf}$ can be derived from the common collector resistance of the output emitter follower. $V_{Inf}$ is maximum and proportional to the overall track width if the head is positioned on the track, while $V_R$ then has just the desired passage through zero.

When used in digital systems, the sensitivity can even be increased by using $I_o$ as a pulse current with low duty cycle (so as to restrict the dissipation) which is derived from a digital clock. In this manner bit detection may take place simultaneously or an alternating voltage signal which can be amplified more easily can be obtained in the case of record carriers which slowly move or are stationary when played back.

It will generally be of advantage that the magnetoresistance playback head according to the invention is combined with an inductive recording head. For optimum playback of the signals recorded by the recording head it is of great importance that the gap of the recording head be accurately parallel to the magnetoresistance playback head and that the distance between the recording head and the magnetoresistance playback head be small. For example, an integrated recording head and the magnetoresistance playback head shown in FIG. 1 may be provided on either side of a plane parallel substrate. To those skilled in the art it will present no problems to manufacture a substrate having two mutually accurately parallel sides, while the manufacture of magnetic heads by means of integrated technologies (both in planar and in stratified structure) is known from the art.

An alternative possibility as shown in FIG. 1*a* is to provide the magnetoresistance element in the gap of an inductive recording head, for example, by means of vapour deposition. This presents an important advantage, notably in the case of a disc memory. Due to such an arrangement it is prevented actually that the recording head and sensing element start travelling on different radii.

The relation between the voltage across a magnetoresistance element and the field of the recording medium is in fact parabolic. Linearization can be effected by causing a magnetic bias voltage field to influence the element. The bias voltage field at the area of the element must necessarity be large as compared with the field of the recording medium, but on the other hand the stray field of the means which have to produce the bias voltage field may not be able to influence the recording medium: this means that said stray field must be very small at the area of the medium as compared with the field of the recording medium itself. Nor may, viewed from the magnetoresistance elements, the means to apply the bias voltage field deform the field of the recording medium. A further requirement is that for supplying a correct positioning signal the detection element must "feel" a bias voltage field which is as uniform as possible, which means that the parallism between the device to produce the bias voltage field and the detection element, as well as their mutual distance, must be very accurately defined.

Several manners to produce a bias voltage field and to cause it to influence a magnetoresistance strip are known and may be used in the scope of the invention.

The displacement of the head may be realized, for example, by mounting the head on a swingable arm which is maintained in an equilibrium position as a result of the pretension of a spring and the electromagnetic force of an electromagnet when the sensing element produces no signal and which, when the sensing element does produce a signal meaning that the head is not positioned correctly on the track, is drawn out of its equilibrium position by the electromagnet. However, the invention is not restricted to the above-described servo device.

What is claimed is:

1. A device for the automatic control of the position of a magnetic playback head with respect to a selected information track of a number of information tracks recorded on a magnetic recording medium, which device comprises a magnetic playback head for reading a selected information track of a number of information tracks recorded on a magnetic recording medium track, means controlled by an error signal for moving the head to arrange it centrally on the track, an elongate sensing element of magnetoresistance material which has a first and a second end tap and a center tap and the length of which corresponds to the track width of the information tracks in said recording medium, the difference between the voltage across the first end tap and the center tap and the voltage across the second end tap and the center tap being indicative of the position of the playback head with respect to the recorded information track and means for converting said voltage difference into said error signal.

2. A device as claimed in claim 1, wherein the sensing element is also a playback head, in which the sum of the voltage across the first end tap and the other tap and the voltage across the second end tap and the center tap represents the information recorded in the information track.

3. A device as claimed in claim 1, wherein the halves of the sensing element of magnetoresistance material which are present on either side of the center tap are decoupled magnetostatically.

4. A device as claimed in claim 2, wherein the sensing element of magnetoresistance material extends in the gap of a recording head.

* * * * *

UNITED STATES PATENT AND TRADEMARK OFFICE
CERTIFICATE OF CORRECTION

PATENT NO. : 3,918,091

DATED : November 4, 1975

INVENTOR(S) : ANTHONIE WALRAVEN, JACOB KOORNEEF and JAN ANTOON LUDOLF POTGIESSER It is certified that error appears in the above-identified patent and that said Letters Patent are hereby corrected as shown below:

ON THE TITLE PAGE

In Section [75] Inventors "Potgiesse" should be --Potgiesser--;

In Section [30] Foreign Application Priority Data

"739590" should be --7309590--;

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*